United States Patent [19]
Lassota

[11] 4,431,387
[45] * Feb. 14, 1984

[54] HERMETIC REFRIGERATION ROTARY MOTOR-COMPRESSOR

[76] Inventor: Marek J. Lassota, 8657 W. Foster Ave., Chicago, Ill. 60656

[ * ] Notice: The portion of the term of this patent subsequent to Nov. 13, 1996 has been disclaimed.

[21] Appl. No.: 318,876

[22] Filed: Nov. 6, 1981

Related U.S. Application Data

[63] Continuation-in-part of Ser. No. 93,599, Nov. 13, 1979, abandoned, which is a continuation-in-part of Ser. No. 821,729, Aug. 4, 1977, Pat. No. 4,174,195, which is a continuation-in-part of Ser. No. 692,199, Jun. 2, 1976, abandoned, which is a continuation-in-part of Ser. No. 659,430, Feb. 19, 1976, abandoned, which is a continuation-in-part of Ser. No. 610,159, Sep. 4, 1975, Pat. No. 4,010,675, which is a continuation of Ser. No. 523,958, Nov. 14, 1974, abandoned.

[51] Int. Cl.[3] .......................... F01C 1/24; F01C 21/12; F04C 17/16; F16J 1/24

[52] U.S. Cl. .......................................... 418/1; 418/83; 418/97; 418/142; 417/460; 417/372; 417/902

[58] Field of Search .................... 418/1, 15, 54, 58–60, 418/151, 160, 83, 97, 142; 417/460, 462–466, 372, 902; 123/425, 51 B; 91/196; 92/177

[56] References Cited

U.S. PATENT DOCUMENTS 3,279,683 10/1966 Kleinlein .......................... 417/902 X
4,174,195 11/1979 Lassota .................................. 418/1

*Primary Examiner*—Richard E. Gluck
*Attorney, Agent, or Firm*—Thomas W. Speckman

[57] ABSTRACT

A hermetic refrigeration rotary motor-compressor comprising a hermetically sealed pressure tight housing can enclosing a compressor unit comprising a housing having at least two axially spaced walls and rotatable in relation to the housing piston and cylinder-piston journaled on eccentric portions of two oppositely rotatable shafts. The piston and cylinder-piston form movable walls, and axially spaced walls of the housing form stationary walls of at least two compression chambers. The compressor unit may be operated by any suitable prime mover, preferably an electric motor. An intake charge of refrigerant vapor may cool the motor unit and is admitted into the compression chamber through intake ports and discharged through a system of discharge valves into the discharge line.

16 Claims, 6 Drawing Figures

HERMETIC REFRIGERATION ROTARY MOTOR-COMPRESSOR

CROSS REFERENCE TO RELATED APPLICATIONS

This application is a continuation-in-part of my application, Ser. No. 93,599, filed Nov. 13, 1979, now abandoned, which is a continuation-in-part of Ser. No. 821,729, filed Aug. 4, 1977, now U.S. Pat. No. 4,174,195, which is a continuation-in-part of my prior application, Ser. No. 692,199, filed June 2, 1967, now abandoned, which is a continuation-in-part of my prior application, Ser. No. 659,430, filed Feb. 19, 1976, now abandoned, which is a continuation-in-part of my earlier application, Ser. No. 610,159, filed Sept. 4, 1975, now U.S. Pat. No. 4,010,675, which is a continuation of prior application Ser. No. 523,958, filed Nov. 14, 1974, now abandoned.

BACKGROUND OF THE INVENTION

This invention relates in general to a refrigeration compressor, and more particularly to a hermetic refrigeration rotary motor-compressor.

Reciprocating piston refrigeration hermetic motor-compressors are well known in the art. They possess, however, inherent disadvantages of having reciprocating motion of a piston causing high stresses in certain components, vibration, noise, and limiting their rotational speeds. Further, they must be equipped with suction valves complicating design, lowering efficiency and causing other numerous disadvantages.

Various types of rotary compressors have been proposed to replace the reciprocating piston compressors in the refrigeration, air conditioning and other systems, in order to overcome some of their disadvantages, and to realize new advantages. However, such efforts have not been fully successful and the reciprocating piston compressor is in widespread use in hermetic motor-compressor machines today.

SUMMARY OF THE INVENTION

The hermetic refrigeration rotary motor-compressor of this invention comprises generally a hermetically sealed pressure tight housing can enclosing a motor-compressor comprising an electric motor unit and a multiple compression chamber rotary compressor unit of my prior invention as more fully described in my allowed patent application to issue as U.S. Pat. No. 4,174,195, the disclosure of which is incorporated herein in full by reference. The compressor unit comprises generally an outer housing within which rotatable piston and cylinder-piston elements are received. The housing comprises at least two axially spaced walls, and the piston and cylinder-piston are operatively positioned between and adjacent to them. The piston and cylinder-piston are journaled on eccentric portions of two shafts, while the eccentric portions are disposed between the axially spaced walls of the housing. The shafts are journaled in axially spaced walls and are interconnected by a gearing means to transmit power from a drive shaft to a driven shaft and to coordinate their movements in such a way so the shafts rotate in coordinated rotations in opposite directions and with equal speeds. Each piston and cylinder-piston follow coordinated planetary movements in opposite directions with and about the eccentric portions of their shafts and form movable walls of two compression chambers, whereas the stationary walls of the compression chamber are formed by the axially spaced walls of the housing. Any desired number of piston and cylinder-piston modules can be mounted on suitable shafts and between suitable stationary walls to form a rotary compressor with 2, 4, 6 or more compression chambers. An intake charge of refrigerant vapor may be used to cool the motor unit and is admitted into the compression chamber through intake ports and discharged through discharge valves.

The rotor of an electric motor is operatively mounted on one of the two shafts, and a stator of the motor is supported by suitable supporting means in operative relation to the rotor. The motor-compressor is also operatively positioned inside the housing can by suitable supporting means.

OBJECTS OF THE INVENTION

One object of the present invention is to provide a hermetic refrigeration rotary motor-compressor having multi-compression chambers and which is simple in construction, compact and lightweight.

Another object of the present invention is to provide a hermetic refrigeration rotary motor-compressor having an intake system with intake ports and a discharge system with discharge valves.

Yet another object of the present invention is to provide a hermetic refrigeration rotary motor-compressor capable of well balanced operation over a wide range of RPM.

Still another object of the present invention is to provide a compact hermetic refrigeration rotary motor-compressor capable of long and trouble-free service life.

These and other objects of the present invention will become apparent when reading the annexed detailed description in view of the drawings:

DESCRIPTION OF THE PREFERRED EMBODIMENTS

Figure 1:
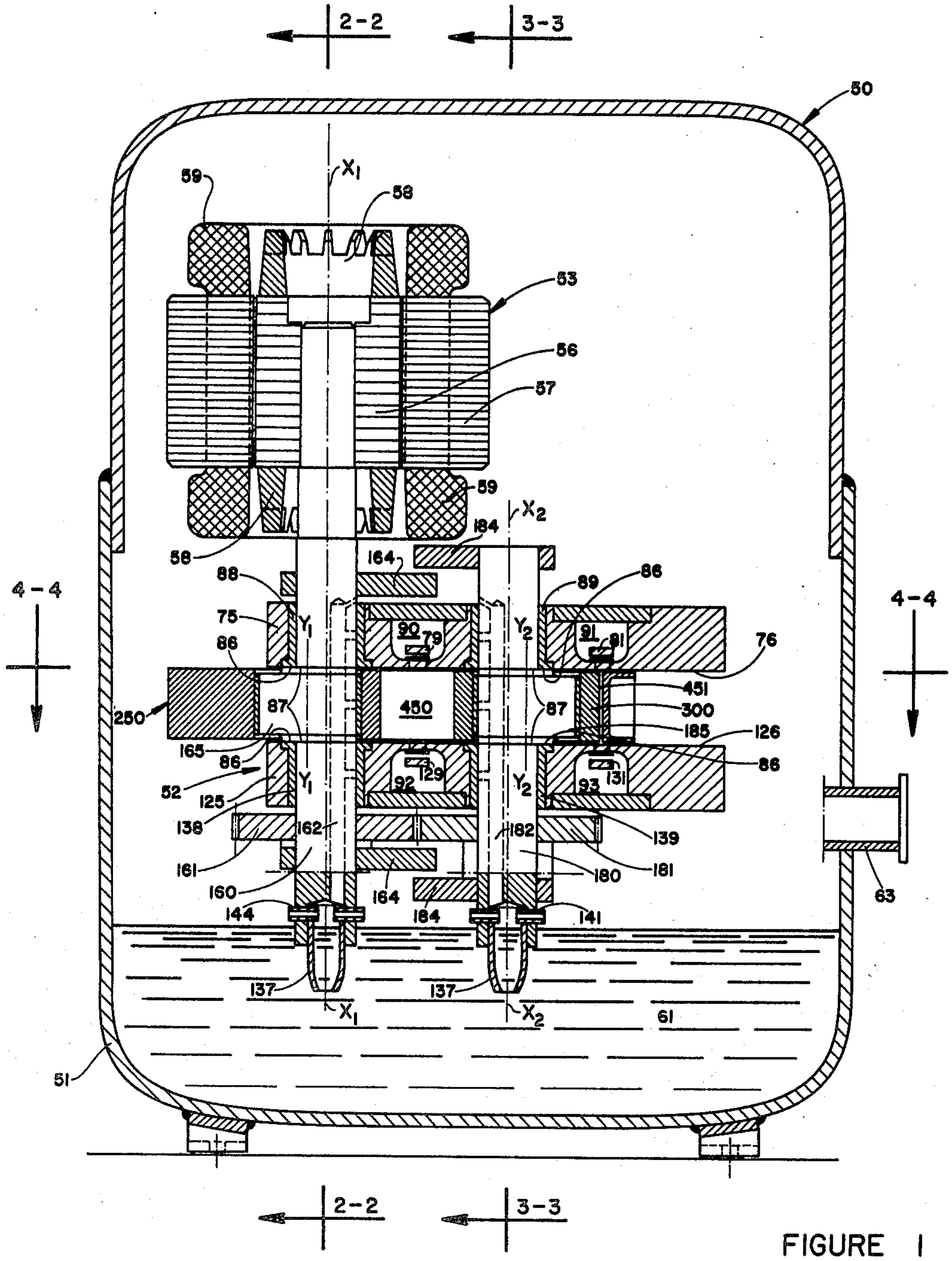
FIG. 1 is a vertical sectional view through a hermetic refrigeration rotary motor-compressor of this invention having two compression chambers, taken along the lines 1—1 in FIGS. 2, 3, 4 and 5.
Figure 2:
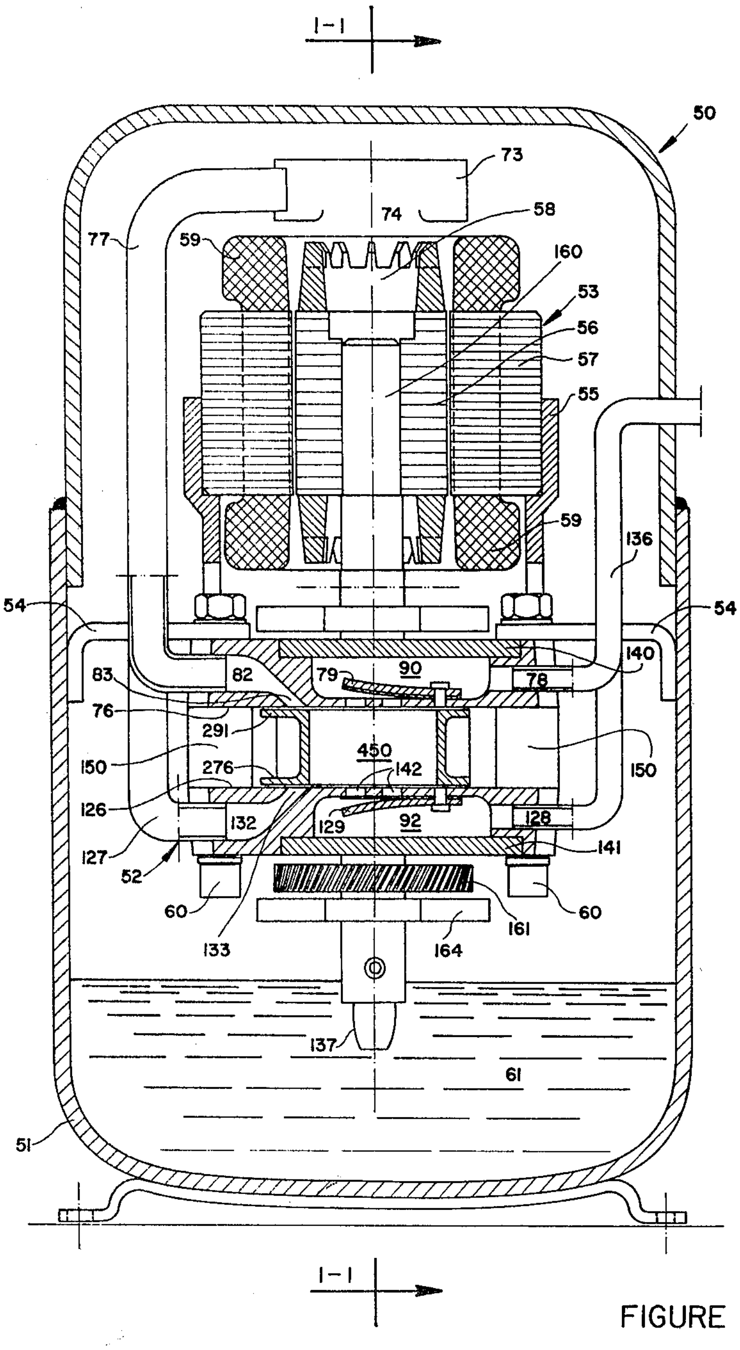
FIG. 2 is a vertical sectional view through the hermetic refrigeration rotary motor-compressor of FIG. 1 taken along lines 2—2 of FIGS. 1, 4 and 5, showing one compression chamber and its intake and discharge systems.

Referring first to FIGS. 1, 2, 3, 4 and 5 of the drawings, a hermetic refrigeration rotary motor-compressor according to one embodiment of the invention is indicated generally by numeral 50. Hermetic motor-compressor 50 comprises hermetically sealed pressure tight housing can 51 within which compressor unit 52 having two compression chambers is positioned by supporting means 54, as best seen in FIG. 2.

The compressor unit having multiple compression chambers suitable for use in this invention is more fully described in my U.S. Pat. No. 4,174,195, the disclosure of which is incorporated herein in its entirety by reference. Compressor unit 52 comprises cylinder-piston 250 and piston 300 journaled on eccentric portions 165 and 185 of shafts 160 and 180, respectively, the shafts rotatable in opposite directions, and two walls 75 and 125 having surfaces 76 and 126 axially spaced by spacers 150. Spaced walls 75 and 125 form stationary walls of compression chamber 450 and 451 and portions of surfaces 76 and 126 of spaced walls 75 and 125 define stationary surfaces of compression chambers 450 and 451. Axially spaced walls 75 and 125 are fastened by suitable fastening means, as for example bolts 60. In the design as illustrated in FIGS. 1, 2, 3, 4 and 5, bolts 60 fasten walls 75 and 125 and are located inside of spacers 150, spacing walls 75 and 125 axially along axes $X_1$—$X_1$ and $X_2$—$X_2$ of shafts 160 and 180.

Figure 3:
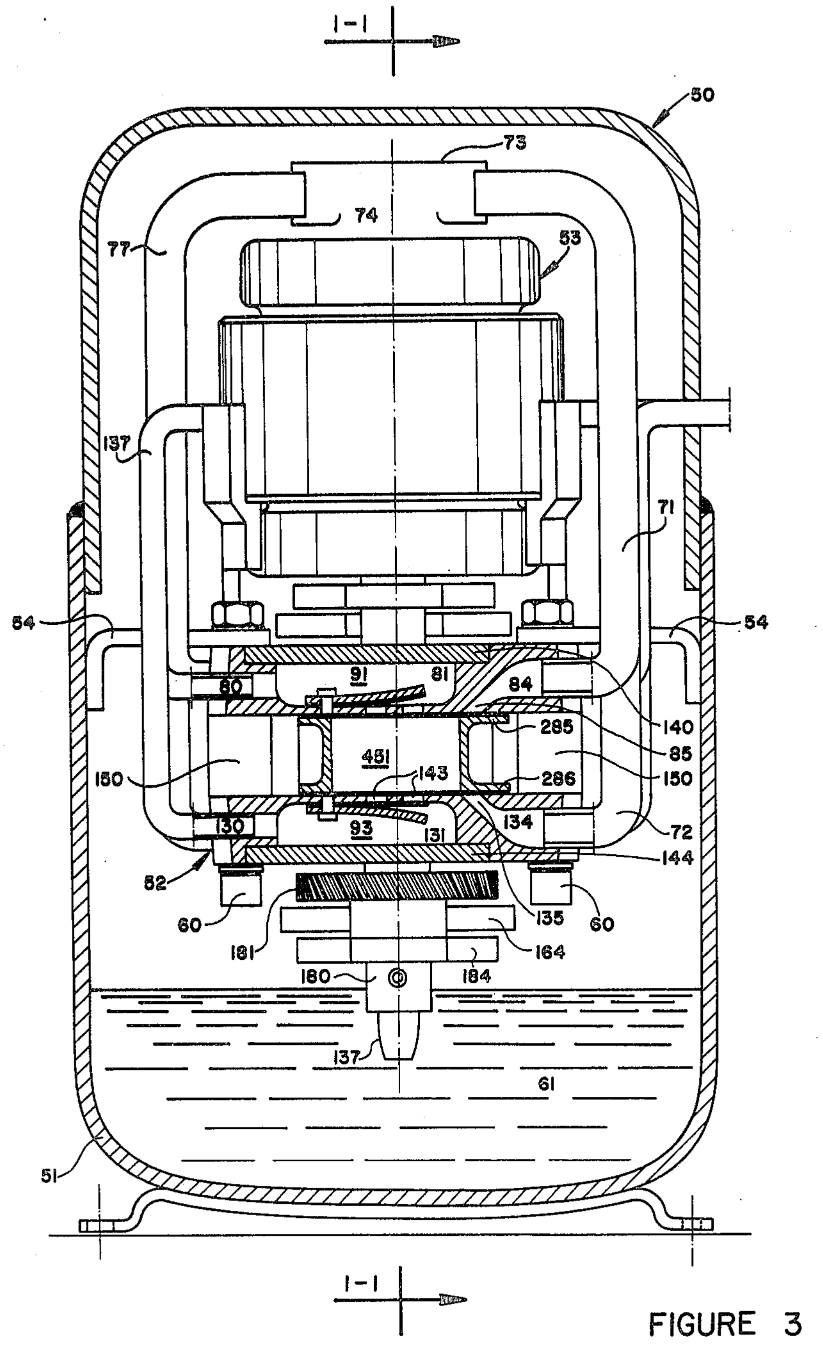
FIG. 3 is a vertical sectional view through the hermetic refrigeration rotary motor-compressor of FIG. 1 taken along lines 3—3 of FIGS. 1, 4 and 5, showing the other compression chamber and its intake and discharge systems.
Figure 4:
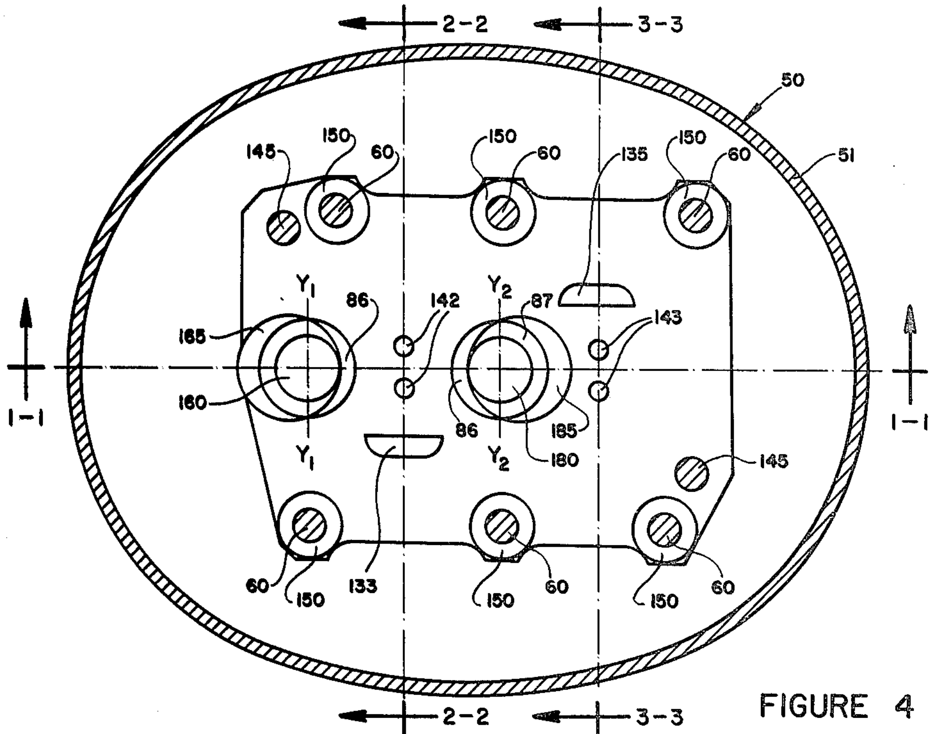
FIG. 4 is a longitudinal sectional view taken along line 4—4 of FIG. 1 and showing one of two axially spaced walls with spacers and both shafts in place.
Figure 5:
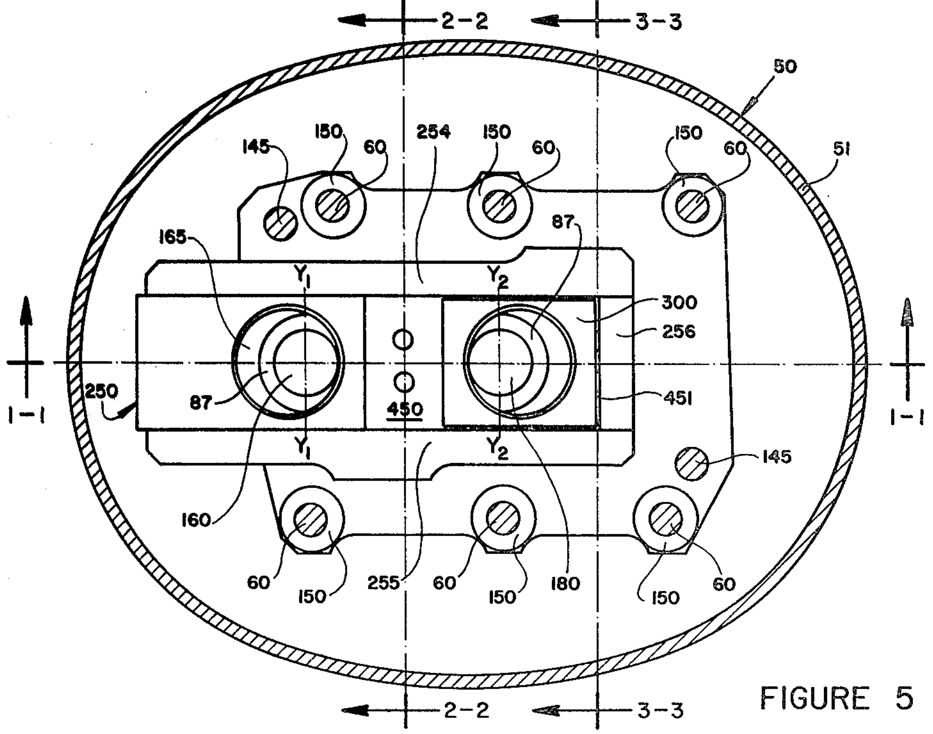
FIG. 5 is a longitudinal sectional view taken along line 4—4 of FIG. 1 and showing the same axially spaced wall with spacers, shafts and piston and cylinder-piston elements assembled.

Internal structures of axially spaced walls 75 and 125 are best shown in FIGS. 1, 2 and 3. Wall 75 has intake channels 82 and 84 communicating with compression chambers 450 and 451 through suitable intake ports 83 and 85, respectively, and discharge channels 78 and 80 connected with compression chambers 450 and 451 by suitable discharge valves 79 and 81 located in discharge valve chambers 90 and 91, respectively. Wall 125 has intake channels 132 and 134 communicating with compression chambers 450 and 451 through suitable intake ports 133 and 135, respectively, and discharge channels 128 and 130 connected with compression chambers 450 and 451 by suitable discharge valves 129 and 131 located in discharge valve chambers 92 and 93, respectively. Discharge valve chambers 90, 91, 92 and 93 are sealed by suitable covers 140 and 141.

In the embodiment illustrated, the intake and discharge systems are shown in both spaced walls 75 and 125. However, any suitable combination of the intake and discharge systems in one or both axially spaced walls can be used.

Intake ports can be of any shape and size as suitable for desired operating characteristics of the compressor.

Figure 6:
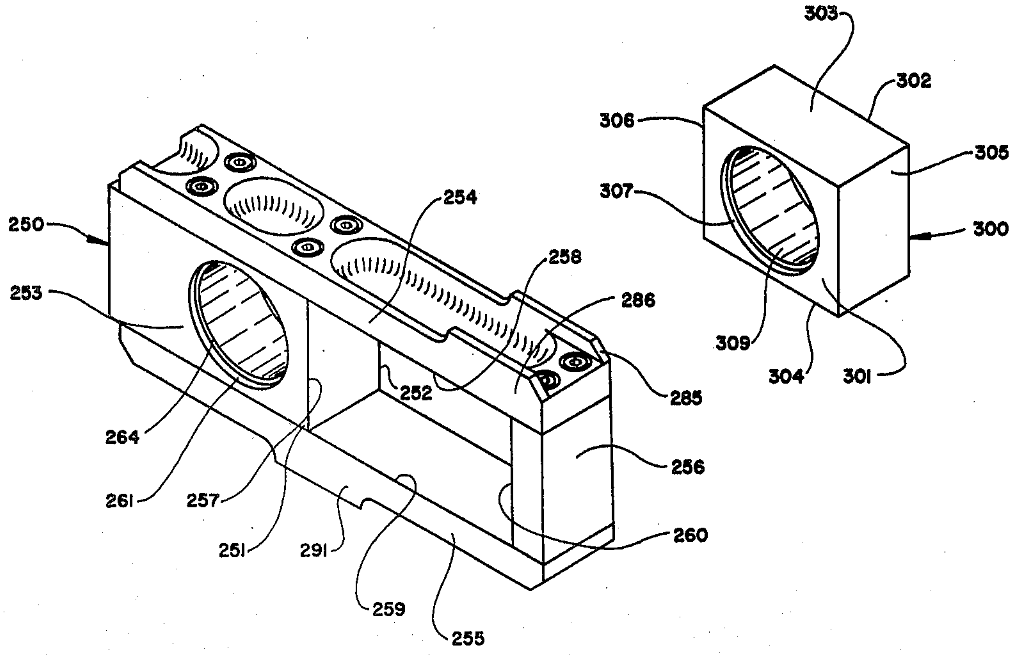
FIG. 6 is a perspective view of the cylinder-piston and piston elements.

Cylinder-piston 250 is best shown in view of FIG. 6. The term "cylinder-piston" refers to an element operating as both a cylinder and a piston, although the configuration of this element is not at all geometrically cylindrical.

Cylinder-piston 250 comprises body 253 and spaced walls 254 and 255 extending from body 253 and connected at their ends remote from body 253 by connecting wall 256. Spaced walls 254 and 255 have opposing parallel surfaces 258 and 259; body 253 has surface 257 and connecting wall has surface 260. Surfaces 257, 258, 259 and 260 define an opening in cylinder-piston 250 in which piston 300 operates. Surfaces 258, 259 and 257 form three of four movable surfaces of compression chamber 450 and surfaces 258, 259 and 260 form three of four movable surfaces of compression chamber 451. Bearing 264 is located in housing 261 of body 253. The portion of body 253, remote from spaced walls 254 and 255 is sufficiently large to act as a balancing means to balance cylinder-piston 250 by making a center of gravity of cylinder-piston 250 located on or close to axis $Y_1$—$Y_1$ common for bearing 264 and eccentric portion 165 of shaft 160. Balancing weight inserts or voids may also be used in this portion of body 253 to obtain good balance, particularly when the cylinder-piston is constructed of light-weight material.

FIG. 6 shows piston 300 with its bearing 309. Piston 300 has spaced side faces 301 and 302 interconnected by passageway 307 in which bearing 309 is located. Piston 300 has also a pair of spaced faces 303 and 304 and pair of end faces 305 and 306. End face 306 connects spaced side faces 301 and 302 and spaced faces 303 and 304 and forms the fourth movable surface of compression chamber 450, changing the volume of compression chamber 450 during the operation of the compressor. Likewise, end face 305 connects spaced side faces 301 and 302 and spaced faces 303 and 304 and form the fourth movable surface of compression chamber 451 changing the volume of compression chamber 451 during the operation of the compressor.

The width of piston 300, measured along axis $Y_2$—$Y_2$ of its bearing 309 is coextensive with the width of cylinder-piston, measured along axis $Y_1$—$Y_1$ of its bearing 264.

Due to its symmetrical shape piston 300 can be readily balanced to have its center of gravity located on or close to the axis $Y_2$—$Y_2$ which is common for bearing 309 and eccentric portion 185 of shaft 180.

Assembled compressor unit 52 of the embodiment illustrated is best seen in FIGS. 1, 2, 3, 4 and 5. Cylinder-piston 250 is journaled on eccentric portion 165 of shaft 160; piston 300 is journaled on eccentric portion 185 of shaft 180 and is slidably positioned between spaced walls 254 and 255 of cylinder-piston 250.

Shafts 160 and 180 are journaled in suitable bearings 88, 89, 138 and 139 located in spaced walls 75 and 125. Bearings 88 and 138 journal shaft 160, and bearings 89 and 139 journal shaft 180. Shafts 160 and 180 are spaced for meshing of gears 161 and 181 and are rotating around axes $X_1$—$X_1$ and $X_2$—$X_2$. This is best seen in view of FIG. 1.

Vertically positioned shafts 160 and 180 are supported axially to keep them in operative relation to other components of compressor unit 52. One way to axially support shafts 160 and 180 is to have thrust bearing surfaces 86 as portions of bearings 88, 89, 138 and 139, with side journal surfaces 87 of eccentrics 165 and 185 disposed between and adjacent to bearing thrust surfaces 86. Thrust bearing surfaces 86 of bearings 88, 89, 138 and 139 may have suitable grooves to distribute lubricant on thrust bearing surfaces 86.

Separate shaft bearings 88, 89, 138 and 139 and cylinder-piston and piston bearings 264 and 309, as shown in the embodiment illustrated, can be replaced by suitable bearings machined directly in axially spaced walls 75 and 125 and in cylinder-piston body 253 and piston 300 if elements 75, 125, 253 and 300 are made of material having suitable bearing properties. For example, one such material can be suitable grade of cast iron. Bearing means suitable for all of the bearings of the compressor may be separate press fit or directly machined bearings or mixtures of such different types of bearings.

Axially spaced walls 75 and 125 with bearings journaling shafts 160 and 180 should be aligned by suitable means, as for example suitable dowel pins 145.

An electric motor unit 53 of the embodiment illustrated is also best seen in FIGS. 1 and 2. Rotor 56 is shown operatively mounted on cylinder-piston shaft 160. Stator 57 is supported in operative relation to rotor 56 by means of stator support 55, which is best seen in FIG. 2. Fan-like portions 58 of rotor 56 may force the intake refrigerant charge through the gap between rotor 56 and stator 57 and around motor windings 59 to cool electric motor unit 53 and to separate the intake refrigerant charge from any liquids that may be present, such as liquid refrigerant or oil. Dry intake refrigerant charge may then be routed into intake channels 82 and 132 of axially spaced walls 75 and 125 to compression chamber 450 by suitable intake manifolds 77 and 127, best seen in FIG. 2, and into intake channels 84 and 134 of axially spaced walls 75 and 125 to compression chamber 451 by suitable intake manifolds 71 and 72, best seen in FIG. 3. Main manifold 73, shown in FIGS. 2 and 3, may connect intake manifolds 71 and 77, and admit intake charge from a refrigeration system into manifolds 71 and 77 through opening 74, after intake charge of refrigerant vapor has been separated from liquid droplets by rotor ends 58.

Electric motor unit 53 may be connected to any suitable source of electric power in any suitable manner.

Shafts 160 and 180 are dynamically balanced by suitable balancing elements 164 and 184 secured to shafts 160 and 180. Balanced shafts 160 and 180 have their centers of gravity located on or sufficiently close to their axes of rotation $X_1$—$X_1$ and $X_2$—$X_2$, as required for balanced operation of a rotary compressor, or motor-compressor of this invention.

Suitably designed and shaped rotor 56 of electric motor unit 53 may also be used as a balancing element instead of balancing element 164 to balance shaft 160.

Shafts 160 and 180 are interconnected by suitable gears 161 and 181 to transmit power from a drive shaft to a driven shaft and to coordinate their rotations and rotate in coordinated rotations in opposite directions with equal speeds. Cylinder-piston 250 and piston 300 follow coordinated planetary rotations in opposite directions with and about eccentric portions 165 and 185 of shafts 160 and 180. Spaced faces 303 and 304 of piston 300 are disposed adjacent to opposing parallel surfaces 258 and 259 of spaced walls 254 and 255. Side face 251 of cylinder-piston 250 and spaced side face 301 of piston 300 are adjacent to surface 76 of wall 75. Likewise, side face 252 of cylinder-piston 250 and spaced side face 302 of piston 300 are disposed adjacent to surface 126 of wall 125. Surfaces 257, 258 and 259 of cylinder-piston 250 and end face 306 of piston 300 form movable surfaces of compression chamber 450. Movement of surface 306 of piston 300 with respect to surfaces 256, 257 and 271 of cylinder-piston 250 changes the volume of variable volume compression chamber 450. Likewise, surfaces 258, 259 and 260 of cylinder-piston 250 and end face 305 of piston 300 form movable surfaces of second compression chamber 451, and movement of surface 305 with respect to surfaces 258, 259 and 260 changes the volume of compression chamber 451 during the operation of the compressor.

During the operation of the hermetic refrigeration rotary motor-compressor of this invention intake ports 83 and 133 are periodically opened and closed by cylinder-piston 250 and piston 300 to allow flow of intake refrigerant charge into compression chamber 450. Likewise, intake ports 85 and 135 are periodically opened and closed by cylinder-piston 250 and piston 300 to allow flow of intake refrigerant charge to compression chamber 451. The intake ports are opened when the compression chambers are at about their minimum volume, and are closed when the compression chambers are at about their maximum volume.

For efficient operation of the rotary motor-compressor embodying this invention, compression chambers 450 and 451 should be sealed. One manner of sealing the compression chambers is to sealingly engage all movable and stationary elements forming compression chambers. Such sealing engagement between spaced faces 303 and 304 of piston 300 disposed adjacent to opposing parallel surfaces 258 and 259 of walls 254 and 255 of cylinder-piston 250; between side face 251 of cylinder-piston 250 and spaced side face 301 of piston 300 adjacent to surface 76 of wall 75, and between side face 252 of cylinder-piston 250 and spaced side face 302 of piston 300 adjacent to surface 126 of wall 125 can result from a combination of suitable running clearances between these elements, suitable finish of their coacting surfaces, use of lubricant of suitable viscosity and suitable rotational speed of the motor-compressor unit. It should be noted that each of the side faces 251 and 252 represent the same plane for body portion 253, spaced walls 254 and connecting wall 256 of cylinder-piston 250.

However, any suitable sealing system other than above described can be used to seal compression chambers 450 and 451 without departing from the spirit of this invention. Also, housing can 51, a pressure tight vessel, can be pressurized to a desired pressure to minimize leakage from compression chambers 450 and 451 into the inside of housing can 51 regardless of the type of sealing system used to seal compression chambers 450 and 451.

Flanges 291 and 276 of wall 255 of cylinder-piston 250 seal intake ports 83 and 133 of compression chamber 450 and flanges 285 and 286 of wall 253 seal intake ports 85 and 135 of compression chamber 451 from contact with the inside of housing can 51, so only dry refrigerant vapor from suction manifolds 77, 127, 71 and 72 is allowed to enter compression chambers 450 and 451.

However, the motor-compressor of this invention, in certain applications, may operate without sealing of intake ports. Also, in some applications, intake channels 82, 84, 132 and 134 can be connected with the inside of housing can 51 in any desired way.

All coacting surfaces 251, 252, 258 and 259 of cylinder-piston 250; 301, 302, 303 and 304 of piston 300, and surfaces 76 and 126 of axially spaced walls 75 and 125 must be sufficiently wear resistant as required for desired operating characteristics and life of the compressor unit. This can be realized by use of suitable materials for aforementioned elements, and suitable hardness, finish and lubrication of their coacting surfaces.

Bearings of the compressor unit 52 of hermetic motor-compressor 50 of this invention can be lubricated by any lubricant suitable for operation in a refrigeration system. Lubricant may be delivered to the bearings by suitable delivery lines located in shafts 160 and 180. The lubricant can be the same as lubricating gears 161 and 181 and coacting surfaces of cylinder-pixton 250 and piston 300 and spaced walls 75 and 125. Lubricant from suitable reservoir 61 can be distributed to lubricate bearings and other coacting surfaces by any suitable splash, gravity or pump-fed lubricating system. Centrifugal pump fed lubricating system is shown in the embodiment illustrated in FIG. 1 wherein the pump at shaft 160 comprises element 137 and channel 162, and the pump of shaft 180 comprises element 137 and channel 182. Pumps are shown equipped with oil-refrigerant separators 141. Both pumps supply pressurized lubricant from lubricant reservoir 61 through suitable lubricant channels 162 and 182 of shafts 160 and 180 to lubricate bearings and other coacting surfaces of compressor unit 52.

Motor-compressor unit 52 is operatively positioned inside housing can 51 by suitable supporting means 54 positioning motor-compressor unit in such a way so pump components 137 of shafts 160 and 180 are immersed in lubricant of lubricant reservoir 61.

Lubricant used to lubricate coacting surfaces of compressor unit 52 can also be used as a cooling medium to cool components of the compressor.

The hermetic refrigeration rotary motor-compressor of this invention can be constructed of any suitable materials dependent upon the particular use desired, and can be powered by any suitable prime mover, as for example any suitable electric motor as in the embodiment illustrated.

A rotary compressor having multiple compression chambers of an even number, such as four or more, may be used as the compressor unit of the motor-compressor unit for the hermetic refrigeration rotary motor-compressor of this invention. Details of such multiple compression chamber compressors are set forth in U.S. Pat. No. 4,174,195.

The features and operation of the compressor unit 52 of the hermetic refrigeration rotary motor-compressor of this invention are more fully described in my copending U.S. patent application issuing as U.S. Pat. No. 4,174,195, and all skilled in the art will readily apply such description of the operation in describing the operation of compressor unit 52 of the hermetic rotary refrigeration motor-compressor of this invention.

It is understood that the inside of housing can 52 of the hermetic refrigeration rotary motor-compressor disclosed herein can be connected to an appropriate source of any suitable refrigerant vapor, such as, for example, suitable Freon-type vapor. Connection 63 of the can 51 to such appropriate source of intake refrigerant vapor can be made in any desired position and manner.

Discharge channels 78 and 128 from compression chamber 450 can be connected by suitable discharge marifold 136 and discharge channels 80 and 130 from compression chamber 451 can be connected by suitable discharge manifold 137. Manifolds 136 and 137 may be connected together into one main discharge manifold (not shown in the drawings) or can be separately piped to the outside of motor-compressor can 51 to an appropriate receiver for the compressed refrigerant vapor to operate any desired refrigerating system.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A hermetic refrigeration rotary motor-compressor comprising:

a multiple compression chamber compressor unit operatively positioned inside a hermetically sealed pressure tight housing can comprising:

one or more two compression chamber modules, each comprising;

A. a cylinder-piston comprising a body, two spaced walls extending from said body and having opposing parallel surfaces, and a wall interconnecting said two spaced walls at their ends remote from said body to form an opening in said cylinder-piston, said cylinder-piston further having two side faces and bearing means located in said body;

B. a piston positioned within said opening of said cylinder-piston and having spaced faces adjoining said opposing parallel surfaces of said spaced walls of said cylinder-piston, said piston further having two spaced side faces and bearing means in said piston;

C. two fixed spaced housing walls adjoining said side faces of said cylinder-piston and said spaced side faces of said piston;

D. said cylinder-piston and said piston forming movable surfaces, and said fixed spaced housing walls forming stationary surfaces of two compression chambers located between said body of said cylinder-piston and said piston and between said piston and said wall interconnecting said two spaced walls of said cylinder-piston and varying in volumes upon coordinated planetary rotations in opposite directions of said cylinder-piston and said piston;

intake means comprising intake ports leading to said compression chambers;

discharge means leading from said compression chambers;

a rotatable cylinder-piston shaft comprising an eccentric portion journaled in said body of each said cylinder-piston;

a rotatable piston shaft comprising an eccentric portion journaled in each said piston;

gearing means interconnecting said cylinder-piston shaft and said piston shaft so said shafts follow coordinated rotations in opposite directions and each said cylinder-piston and each said piston follow coordinated planetary rotations in opposite directions with and around said eccentric portions of said shafts;

balancing means;

lubricating means;

a hermetically sealed pressure tight housing can;

support means supporting said compressor unit in operative position inside said hermetically sealed pressure tight housing can; and prime mover means for driving said multiple compression chamber compressor unit.

2. The hermetic refrigeration rotary motor-compressor of claim 1 wherein said prime mover means is an electric motor for driving said compressor unit comprising:

a rotor operatively attached to one of said cylinder-piston or said piston shafts;

a stator; and a supporting means for supporting said stator of said motor in operative relation to said rotor of said motor and to said compressor.

3. The hermetic refrigeration rotary motor-compressor of claim 1 wherein said gearing means comprise gears interconnecting said cylinder-piston and said piston shafts and having equal number of teeth so said shafts rotate with equal rotational speeds in opposite directions.

4. The hermetic refrigeration rotary motor-compressor of claim 2 wherein said balancing means comprise cylinder-piston balancing means comprising cylinder-piston balancing portion located in a part of said body of said cylinder-piston remote from said cylinder-piston spaced walls and from said wall interconnecting said spaced walls, said balancing portion making the center of gravity of said cylinder-piston located on or close to the axis of said bearing means located in said body of said cylinder-piston; and wherein said balancing means comprise piston balancing means, said piston balancing means resulting from symmetrical design of said piston so said piston has its center of gravity located on or close to the axis of said bearing means located in said piston; and wherein said balancing means further comprise cylinder-piston shaft and piston shaft balancing means, said last mentioned means comprising balancing elements secured to said shafts and dynamically balancing said shafts with all elements assembled and journaled on said shafts.

5. The hermetic refrigeration rotary motor-compressor of claim 1 wherein said cylinder-piston, said piston and said axially spaced walls are sealingly engaged in forming said compression chamber.

6. The hermetic refrigeration rotary motor-compressor of claim 5 wherein said sealing engagement between said cylinder-piston, said piston and said axially spaced walls results from a combination of running clearances between said cylinder-piston and said piston and between said cylinder-piston, said piston and said axially spaced walls, finish of coacting surfaces of said cylinder-piston, coacting surfaces of said piston and coacting surfaces of said axially spaced walls, use of lubricant to lubricate said coacting surfaces of said cylinder-piston, said piston and said axially spaced walls, and rotational speed of said motor-compressor.

7. The hermetic refrigeration rotary motor-compressor of claim 1 wherein said intake means leading to said compression chambers comprise at least one intake port leading to each of said compression chambers, and located in at least one of said axially spaced walls, said intake ports being periodically opened and closed by said cylinder-piston and said piston to allow for required flow of intake charge into said compression chambers.

8. The hermetic refrigeration rotary motor-compressor of claim 7 wherein said intake ports are opened by said cylinder-piston and said piston when said compression chambers are at about their minimum volume and wherein said intake ports are closed by said cylinder-piston when said compression chambers are at about their maximum volume.

9. The hermetic refrigeration rotary motor-compressor of claim 1 wherein said discharge means leading from said compression chambers comprise at least one discharge valve for each compression chamber located in at least one of said axially spaced walls.

10. The hermetic refrigeration rotary motor-compressor of claim 1 wherein said lubricating means comprise a lubricant reservoir containing lubricant lubricating said bearing means of said cylinder-piston shaft, said bearing means of said piston shaft, coacting surfaces of said cylinder-piston, said piston and said axially spaced walls, and further lubricating said gears interconnecting said cylinder-piston and said piston shafts.

11. The hermetic refrigeration rotary motor-compressor of claim 10 wherein said lubricating means further comprise oil pumps located in said cylinder-piston shaft and said piston shaft, pumping said lubricant through channels located in said cylinder-piston and said piston shafts to lubricate said bearings of said cylinder-piston shaft and said piston shaft and said coacing surfaces of said cylinder-piston, said piston and said axially spaced walls.

12. The hermetic refrigeration rotary motor-compressor of claim 11 wherein said oil pumps located in said cylinder-piston shaft and said piston shaft are centrifugal oil pumps.

13. The hermetic refrigeration rotary motor-compressor of claim 11 wherein said lubricating means further comprise oil-refrigerant separators located between said oil pumps and said channels delivering said lubricant to said bearings of said cylinder-piston and said piston shafts, and to said coacting surfaces of said cylinder-piston, said piston and said axially spaced walls.

14. The hermetic refrigeration rotary motor-compressor of claim 11 wherein said motor-compressor is supported inside said hermetically sealed pressure tight housing can in such a way so said oil pumps located in said cylinder-piston shaft and said piston shaft are immersed in said lubricant contained in said lubricant reservoir.

15. The hermatic refrigeration motor-compressor of claim 1 wherein said bearing means comprises separate press-fit bearings.

16. The hermetic refrigeration motor-compressor of claim 1 wherein said bearing means comprises directly machined bearings.

* * * * *